United States Patent Office 3,639,317
Patented Feb. 1, 1972

3,639,317
SURFACE TREATMENT COMPOSITION
AND METHOD
Duane W. Gagle and Richard J. Bennett, Bartlesville,
Okla., assignors to Phillips Petroleum Company
No Drawing. Filed Mar. 28, 1968, Ser. No. 717,042
Int. Cl. C08f 29/02; E01c 11/24
U.S. Cl. 260—23 H
11 Claims

ABSTRACT OF THE DISCLOSURE

A concrete or other porous surface anti-spalling, water repellent, surface treatment composition, e.g., amorphous polypropylene, as can be obtained in the production of crystalline polypropylene, linseed oil and Stoddard solvent which can be brush-applied to the surface will impart to the surface anti-slip or ice-rejecting properties relative to untreated surface areas, with inhibit frost penetration, and is stable against oils, salts and high and low pH solutions.

---

This invention relates to a composition for treating surfaces such as concrete. In another of its aspects it also relates to a method for treating concrete or other surfaces to prevent spalling thereof and to impart thereto other desirable properties.

In one of its concepts the invention provides a composition comprising a non-crystalline, i.e., amorphous hydrocarbon polymer, and a drying oil cut with a naphtha solvent to a consistency suitable for application to a surface by brushing or other means as by spraying. In another of its concepts the invention provides a method for treating a concrete or other porous surface to prevent spalling thereof and to impart to it certain beneficial properties such as anti-slip properties under icing conditions, the method comprising penetrating the surface with a composition as disclosed herein.

The problem of spalling, especially of concrete, and related surfaces, for example, roadways, driveways, and other structures is well known. Thus, under freezing conditions, moisture which has penetrated into the interstices or porosities of the surface will freeze causing internal pressures which literally lift out pieces of the surface. Further, the growth of ice crystals within the porosities of such surfaces tends to cause the surfaces to become quite slippery due to accumulation of ice thereon.

We have now found that incorporating an amorphous polymer such as amorphous polypropylene, which is now preferred, together with a drying oil and a suitable solvent such as Stoddard solvent into a brushable or otherwise appliable composition and placing this composition onto a surface such as a concrete roadway or driveway subjected to spalling will prevent spalling while areas immediately surrounding the test area will continue spalling. Further we have found that the composition renders the treated area non-slippery under icing conditions.

It is an object of this invention to provide a composition which is suitable for coating a porous surface such as concrete to prevent spalling thereof. It is another object of this invention to provide a composition which can be applied to a porous surface such as concrete to advantageously alter the characteristic of said surface. It is a further object of the invention to provide a method for treating a surface such as a concrete roadway or driveway to prevent spalling thereof and to render it non-slip under icing conditions.

Other aspects, concepts and objects of the invention are apparent from this disclosure and the appended claims.

According to the present invention there is provided a composition suitable for application to porous surfaces such as concrete to improve the properties thereof and to render it resistant to spalling, the composition comprising in its now preferred form an amorphous polypropylene, linseed oil, Stoddard solvent, the proportions being such that there will be sufficient of the amorphous polypropylene laid down in the interstices of the surface to impart the desired properties, sufficient linseed oil to provide adherence within the interstices of the polypropylene and sufficient Stoddard solvent or other hydrocarbon to render the overall composition of brushable consistency when brushing is the manner of application and of another consistency when another method of application is employed, e.g., of sprayable consistency when spraying is employed.

One skilled in the art in possession of this disclosure can readily select by routine test the particular amorphous polymer such as, for example, polypropylene, polyisobutylene and polypentene for this purpose. The amorphous polypropylene preferably employed in the practice of the present invention has a molecular weight in the range of about 2,000 to about 100,000 as determined by light scattering, a density (ASTM D1505–60T) in the range of about 0.83 to about 0.90 at 25° C., and a crystallinity of less than about 10 percent as determined by X-ray diffraction. It can be formed by polymerizing propylene with any catalyst system well known in the art. It must be understood that polypropylene produced by any suitable process can be used in the practice of the invention. Presently, now preferred is that amorphous polypropylene which results as a by-product of the production of high density crystalline polypropylene as produced according to a process disclosed and claimed in U.S. Pat. 2,825,721, issued Mar. 4, 1958, John Paul Hogan and Robert L. Banks. The patent disclosure is incorporated herein by reference. The amorphous polymers used herein may also contain dyes, pigments, fillers and additives which are well known in the art, to stabilize them and to protect them against degradation by light, especially ultraviolet radiation.

In lieu of the linseed oil, other drying oils can be readily selected. Among such oils are: tung oil, aromatic petroleum alkylate, acid soluble oil from HF alkylation, soya oil, highly aromatic extract oils obtained in processing of crude oil, and the like.

The solvent employed will, of course, be one which will dilute the drying oil and the amorphous polymer or polypropylene. Although Stoddard solvent is now preferred, other hydrocarbon solvents such as hexane, heptane, naphtha, and others or mixtures of these can be employed.

The proportions of the ingredients in the composition can be fairly broad. Thus, the amorphous polymer or polypropylene can be 10–75 weight percent of the composition. The drying oil, i.e., the tung oil or linseed oil, can be 90–25 weight percent of the composition. To this mixture there will be added only the amount of Stoddard solvent, naphtha or other hydrocarbon solvents to bring the mixture to a brushable or sprayable consistency.

The following three compositions are now considered to be representative of those within the scope of the invention which can be applied specifically to a concrete driveway which is exposed to the elements.

EXAMPLE I

Atactic polypropylene was cut with naphtha and applied to a concrete wheel stop in a parking area. Ready penetration occurred. No film was formed. The concrete was dry to the touch after a short time. This wheel stop exhibited ice-repellent properties.

EXAMPLE II

Linseed oil was added to the polypropylene and naphtha mixture of Example I. Upon application a film was formed, albeit there was penetration as the application was made. The film had a slight adhesive tack and did not dry or oxidize as might have been expected.

EXAMPLE III

A mixture of 33⅓ percent linseed oil and 66⅔ percent of atactic polypropylene was cut with Stoddard solvent and applied to an area on a concrete drive exposed to the elements. Although breaking or spalling continued to occur on the untreated areas, the spalling stopped on the treated area. On cracked secimens of the driveway, the mixture penetrated much better than the oil alone which seemed to bridge. There was added about 5 parts per million of DC 200 silicone, a penetration agent consisting of Dow Corning ("DC"), silicone having a viscosity of 200 centistokes. This seemed to improve penetration. The characteristic oxide film of linseed oil did not develop and an adhesive tackiness was noticed and still persisted after several months observation.

The fact that the composition of the invention penetrates into the concrete to form a water-repellent coating gives it a particular advantage over the usual oil coatings which do not penetrate and therefore wear off quickly.

It is within the scope of the invention to include other penetrating or surface-active agents to improve when needed the penetration properties of the composition.

It has been observed during a prolonged freezing weather on the treated driveway that on occasion when ice formed on the pavement due to freezing drizzle, the test areas were clearly not slippery and did not have an ice coating as was formed by the freezing drizzle on the non-treated areas. It appeared that the treated area rejected the ice crystals which formed on the untreated areas.

Reasonable variation and modification are possible within the foregoing disclosure and the appended claims to the invention, the essence of which is that an amorphous polymer such as amorphous polypropylene and a drying oil extended to appliable consistency with a solvent has been found to prevent spalling of concrete or other porous surfaces and that such compositions as applied by brushing or spraying impart advantageous properties to the treated surface for example, non-slip properties.

We claim:

1. A cement and related materials penetrating composition suitable for application to a porous cement surface to prevent spalling thereof which consists essentially of an amorphous polyolefin and a drying oil diluted with a hydrocarbon solvent.

2. A composition according to claim 1 wherein the amorphous polyolefin is amorphous polypropylene.

3. A composition according to claim 2 wherein the amorphous polypropylene and the drying oil are admixed in proportions as follows:

|  | Weight percent |
|---|---|
| Amorphous polypropylene | 10-75 |
| Drying oil | 90-25 |

4. A composition according to claim 1 wherein there is also included a penetrating agent in addition to said oil and said solvent.

5. A composition according to claim 4 wherein the agent is a silicone.

6. A composition according to claim 1 wherein the drying oil is linseed drying oil.

7. A composition according to claim 6 wherein there is included a silicone.

8. A method of protecting a porous surface such as a concrete driveway against spalling which comprises applying thereto a composition according to claim 1.

9. A method of protecting a porous surface such as a concrete driveway against spalling which comprises applying thereto a composition according to claim 2.

10. A method of protecting a porous surface such as a concrete driveway against spalling which comprises applying thereto a composition according to claim 3.

11. A composition consisting essentially of a concrete and dispersed within its interstices an amorphous polypropylene and a drying oil.

References Cited

UNITED STATES PATENTS

| 3,139,412 | 6/1964 | Sterling | 260—23 |
| 3,141,304 | 7/1964 | Moore | 61—36 |
| 3,261,269 | 7/1966 | McGovern | 94—23 |
| 2,307,629 | 1/1943 | MacIldowie | 106—95 X |

OTHER REFERENCES

Kirk-Othmer "Encyclopedia of Chemical Technology," vol. 12, p. 408.

DONALD E. CZAJA, Primary Examiner

D. J. BARRACK, Assistant Examiner

U.S. Cl. X.R.

94—5, 22; 106—95; 117—161 UF; 260—33.6 PQ